US 9,780,599 B2

(12) United States Patent
Huang et al.

(10) Patent No.: US 9,780,599 B2
(45) Date of Patent: Oct. 3, 2017

(54) ELECTRONIC DEVICE AND METHOD OF DETECTING EFFICIENCY OF CHARGING

(71) Applicant: ASUSTeK COMPUTER INC., Taipei (TW)

(72) Inventors: Yi-Ming Huang, Taipei (TW); Wei-Chen Tu, Taipei (TW); Ming-Ting Tsai, Taipei (TW); Hsiang-Jue Hung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 165 days.

(21) Appl. No.: 14/859,372

(22) Filed: Sep. 21, 2015

(65) Prior Publication Data

US 2016/0126772 A1    May 5, 2016

(30) Foreign Application Priority Data

Oct. 31, 2014    (CN) .......................... 2014 1 0604066

(51) Int. Cl.
*H02J 7/00* (2006.01)
*H02J 7/02* (2016.01)
*H02J 50/10* (2016.01)
*H02J 50/90* (2016.01)
*H02J 50/80* (2016.01)

(52) U.S. Cl.
CPC .............. *H02J 7/025* (2013.01); *H02J 50/10* (2016.02); *H02J 50/80* (2016.02); *H02J 50/90* (2016.02)

(58) Field of Classification Search
CPC .. H02J 50/10; H02J 50/80; H02J 50/90; H02J 7/025

USPC ........................................................... 320/108
See application file for complete search history.

(56) References Cited

U.S. PATENT DOCUMENTS

2008/0197712 A1* 8/2008 Jin ........................ H02J 5/005
307/104
2016/0069674 A1* 3/2016 Govoni ................... H02J 50/10
702/150

FOREIGN PATENT DOCUMENTS

CN          103378655 A       10/2013
CN          103545880 A       1/2014

* cited by examiner

*Primary Examiner* — Nathaniel Pelton
(74) *Attorney, Agent, or Firm* — CKC & Partners Co., Ltd.

(57) ABSTRACT

An electronic device includes an energy collection circuit, a rectifier circuit, and a control unit. The energy collection circuit receives an energy signal transmitted via transmission frequency from a wireless charger base. The rectifier circuit generates a drive voltage according to the energy signal. The control unit compares the drive voltage with a reference voltage, and compares the transmission frequency with a reference frequency. When the drive voltage is less than or equals to the reference voltage, or when the transmission frequency is lower than or equals to the reference frequency, the control unit outputs position deviation information. The electronic device detects the efficiency of the wireless charging, and reminds the user whether the position of the electronic device needs to be adjusted, which ensures an efficient charging.

9 Claims, 4 Drawing Sheets

ELECTRONIC DEVICE AND METHOD OF DETECTING EFFICIENCY OF CHARGING

CROSS-REFERENCE TO RELATED APPLICATION

This application claims the priority benefit of China application serial No. 201410604066.1, filed on Oct. 31, 2014. The entirety of the above-mentioned patent application is hereby incorporated by reference herein and made a part of specification.

BACKGROUND OF THE INVENTION

Field of the Invention

The disclosure relates to an electronic device and, more particularly, to an electronic device with a wireless charging function.

Description of the Related Art

It is convenient for the users to charge the electronic devices without additional transmission lines. Thus, the wireless charging technology equipped in electronic devices is a recently trend.

Generally, the electronic device is charged when placed at a wireless charger base. However, when the electronic device is not placed at an appropriate position of the base, the electronic device cannot be recognized and thus cannot be charged.

When the position of the electronic device has a slight position deviation, the wireless charger base increases the transmission power to continue charging the electronic device. However, when the transmission power is too high, the charging efficiency of the electronic device becomes low and the wireless charger base is damaged.

BRIEF SUMMARY OF THE INVENTION

An electronic device includes an energy collection circuit, a rectifier circuit and a control unit. The energy collection circuit receives an energy signal transmitted via transmission frequency from a wireless charger base. The rectifier circuit generates a drive voltage according to the energy signal. The control unit compares the drive voltage with a reference voltage, and compares the transmission frequency with a reference frequency. When the drive voltage is less than or equals to the reference voltage, or when the transmission frequency is lower than or equals to the reference frequency, the control unit outputs position deviation information.

A method of detecting efficiency of charging is applied to an electronic device. The electronic device receives an energy signal transmitted via transmission frequency from a wireless charger base, and the electronic device generates a drive voltage according to the energy signal. The method of detecting the efficiency of charging includes following steps: detecting the transmission frequency and the drive voltage; comparing the drive voltage and a reference voltage, and comparing the transmission frequency and reference frequency; and outputting position deviation information when the drive voltage is less than or equals to the reference voltage, or when the transmission frequency is less than or equals to the reference frequency.

In sum, the electronic device detects the efficiency of the wireless charging in real time, and reminds the user whether the position of the electronic device needs to be adjusted, which ensures an efficient charging.

These and other features, aspects and advantages of the present disclosure will become better understood with regard to the following description, appended claims, and accompanying drawings.

DETAILED DESCRIPTION OF THE EMBODIMENTS

Figure 1:
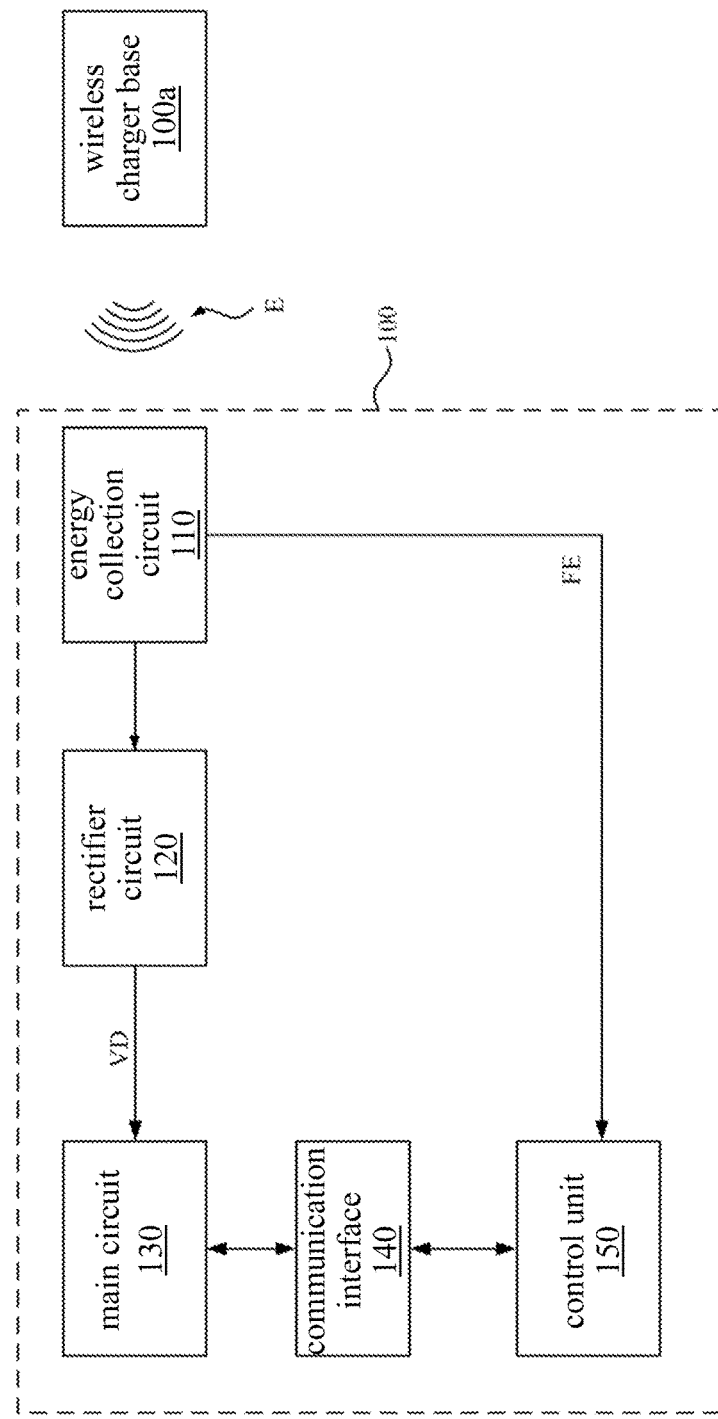
FIG. 1 is a schematic diagram showing an electronic device in an embodiment.

FIG. 1 is a schematic diagram showing an electronic device in an embodiment. In an embodiment, an electronic device 100 may be a notebook computer, a tablet computer or a smart phone, which is not limited herein.

As shown in FIG. 1, the electronic device 100 includes an energy collection circuit 110, a rectifier circuit 120, a main circuit 130, a communication interface 140 and a control unit 150.

When the electronic device 100 is placed closely to the wireless charger base 100a, the wireless charger base 100a starts to transmit the energy signal E to the energy collection circuit 110 via the transmission frequency FE.

The energy collection circuit 110 receives the energy signal E and transmits the energy signal E to the rectifier circuit 120. The rectifier circuit 120 is coupled to the energy collection circuit 110 and rectifies the energy signal E to generate the drive voltage VD. In an embodiment, the rectifier circuit 120 may be a half wave rectifier, a full wave rectifier or a voltage doubling rectifier, which is not limited herein.

The main circuit 130 is coupled to the rectifier circuit 120 to receive the drive voltage. The main circuit 130 includes a central processing unit (CPU), a memory, a screen, a battery, a system control chip of the electronic device 100. In an embodiment, the components of the main circuit 130 are indirectly or directly drived by the drive voltage VD.

The communication interface 140 is coupled between the main circuit 130 and the control unit 150 to transmit data or frequency signals therebetween. In an embodiment, the communication interface 140 is an inter-integrated circuit (I2C) bus, a serial data bus or a parallel data bus, which is not limited.

The main circuit 130 transmits a command to enable the charging efficiency detecting function of the control unit 150 via the communication interface 140. For example, the control unit 150 detects the transmission frequency FE and the drive voltage VD, compares the reference voltage with the drive voltage VD, and compares the transmission frequency FE with the reference frequency. Thus, the control unit 150 determines whether the position of the electronic device 100 has a deviation and whether the electronic device 100 is efficiently charged by the wireless charger base 100a according to the compare result, and the control unit 150 controls the main circuit 130 to display the position deviation information to determine whether the position of the electronic device 100 needs to be adjusted.

The functions and the operation of the electronic device 100 are further illustrated by the embodiments in the following, and the disclosure is not limited thereto.

Figure 2:
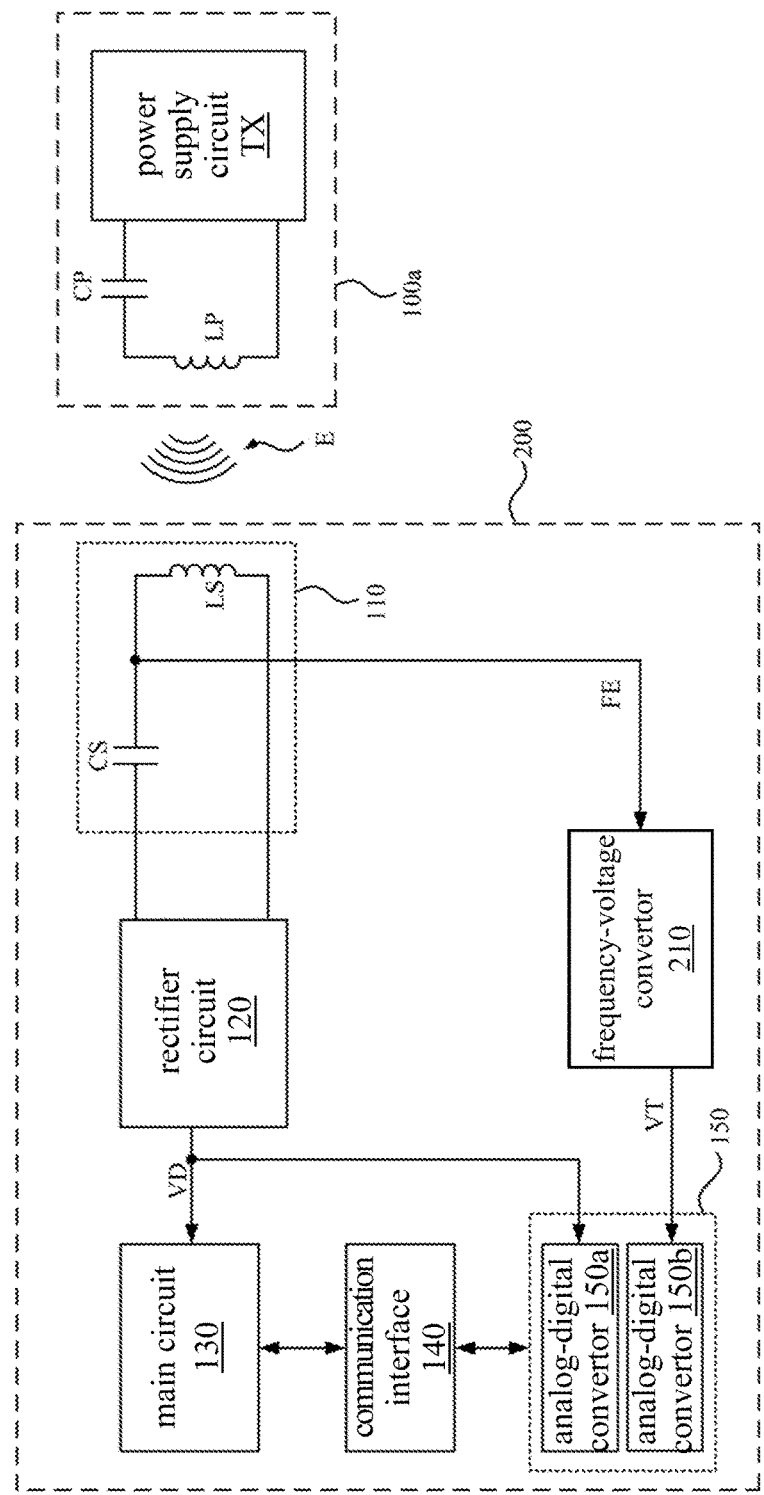
FIG. 2 is a schematic diagram showing an electronic device in an embodiment.

FIG. 2 is a schematic diagram showing an electronic device in an embodiment. As shown in FIG. 2, the functions of the components of the electronic device 200 are similar to those in the electronic device 100, and the similar description is omitted herein. In detail, the wireless charger base 100a includes a power supply circuit TX, the capacitor CP and a coil LP. The energy collection circuit 110 includes a coil LS and a capacitor CS. The coil LS and the capacitor CS are coupled to the rectifier circuit 120 in series.

When the electronic device 200 is placed closely to the wireless charger base 100a, the power supply circuit TX transmits the energy signal E to the coil LS via the electromagnetic induction and the coil LP.

The position of the electronic device 200 needs to be adjusted for more efficient charging in some situations. For example, in the situation when the position of the electronic device 200 has a deviation, the energy collection circuit 110 cannot receive sufficient energy signals E. Then, the main circuit 130 is not driven by the drive voltage VD of the rectifier circuit 120. In another situation when the position of the electronic device 200 has a deviation, the power supply circuit TX reduces the transmission frequency FE and increases the transmission energy to ensure the coil LS receives the energy signal E successfully. However, when the current flowing through the coil LP is too large, the wireless charger base 100a is damaged. As a result, in the previous situations, the position of the electronic device 200 needs to be adjusted to improve the efficiency of the wireless charging.

Consequently, the control unit 150 determines whether the position of the electronic device 200 needs to be adjusted according to the transmission frequency FE and the drive voltage VD. As shown in FIG. 2, the electronic device 200 further includes a frequency-voltage convertor 210. The frequency-voltage convertor 210 obtains the transmission frequency FE by detecting the current flowing through the coil LS. In the embodiment, the transmission frequency FE is the frequency of the current flowing through the coil LS. The frequency-voltage convertor 210 is coupled to the coil LS to detect the transmission frequency FE by detecting the current flowing though the coil LS, and the frequency-voltage convertor 210 generates the transmission voltage VT according to the transmission frequency FE.

As shown in FIG. 2, the control unit 150 includes an analog-digital convertor 150a and an analog-digital convertor 150b. The analog-digital convertor 150a generates the first digital code (not shown in FIG. 2) according to the drive voltage VD, and the analog-digital convertor 150b generates the second digital code (not shown in FIG. 2) according to the transmission voltage VT.

In the embodiment, the control unit 150 pre-stores the first reference digital code (not shown in FIG. 2) corresponding to the reference voltage and the second reference digital code (not shown in FIG. 2) corresponding to the reference frequency. Thus, the control unit 150 determines whether the position of the electronic device 200 has a deviation by comparing the first digital code with the first reference digital code, and comparing the second digital code with the second reference digital code. The operation of the electronic device 200 is described in detail in the following.

Figure 3:
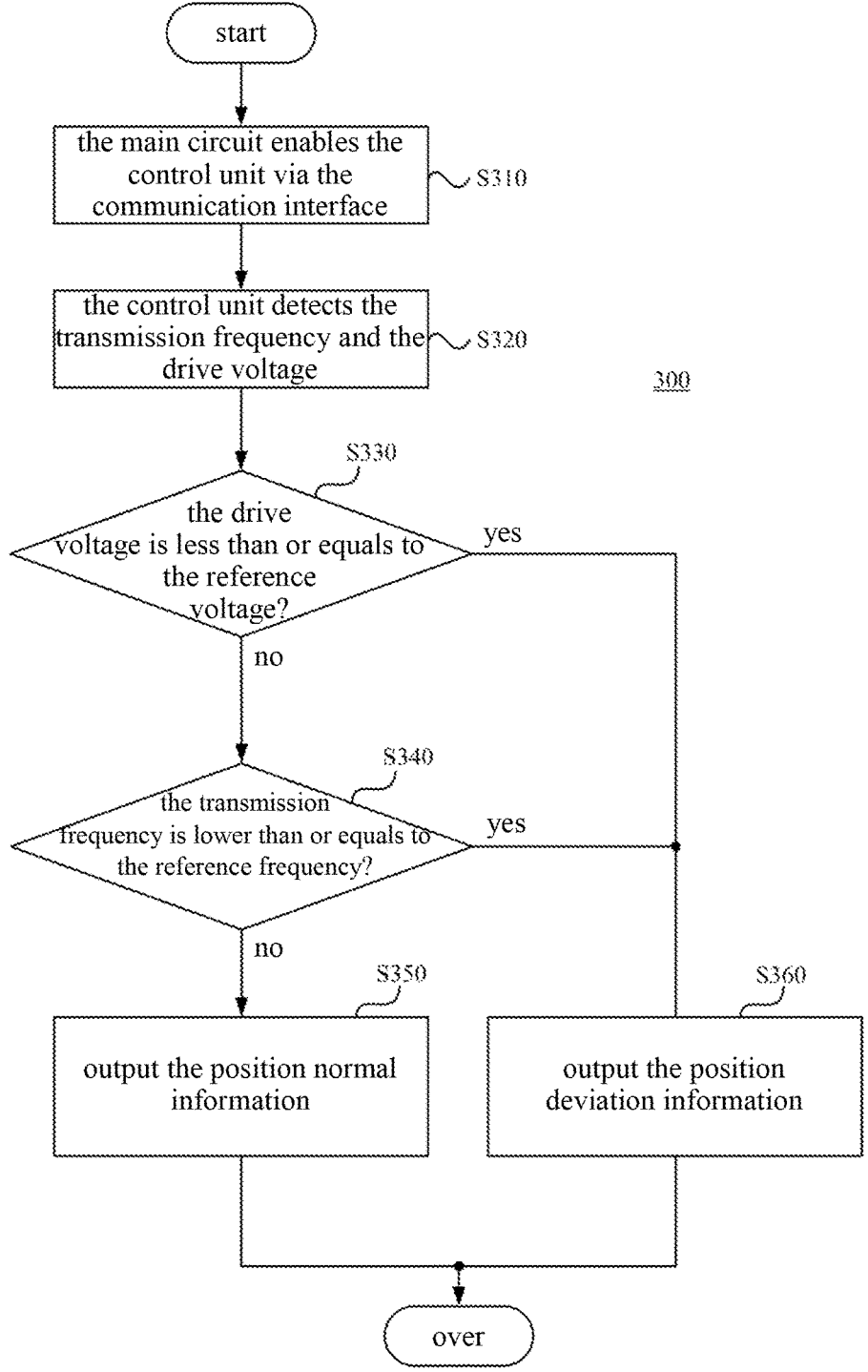
FIG. 3 is a schematic diagram showing a method of detecting efficiency of charging in an embodiment.

FIG. 3 is a schematic diagram showing a method of detecting the efficiency of charging in an embodiment. Please refer to FIG. 2 and FIG. 3, the operation of the electronic device 200 and the method 300 are illustrated.

In step S310, the main circuit 130 enables the control unit 150 via the communication interface 140 to detect the charging efficiency.

In step S320, the control unit 150 detects the transmission frequency FE and the drive voltage VD. For example, the control unit 150 detects the drive voltage VD via the analog-digital convertor 150a to generate the corresponding first digital code. Similarly, the control unit 150 detects the transmission frequency FE via the analog-digital convertor 150b to generate the corresponding second digital code.

In step S330, the control unit 150 compares the drive voltage VD and the reference voltage. If the drive voltage VD is greater than the reference voltage, the step S340 is executed. If the drive voltage VD is less than or equals to the reference voltage, the S360 is executed.

For example, the control unit 150 gets the result of the value comparison between the drive voltage VD and the reference voltage by comparing the first digital code and the first reference digital code corresponding to the reference voltage. For example, when the highest order bit of the first digital code is logic 1 and the highest order bit of the first reference digital code is logic 0, the control unit 150 determines the drive voltage VD is greater than the reference voltage. When the first digital code is the same with the first reference digital code, the control unit 150 determines the drive voltage VD equals to the reference voltage. When the highest order bit of the first digital code is logic 0 and the highest order bit of the first reference digital code is logic 1, the control unit 150 determines the drive voltage VD is less than the reference voltage. The method of comparing the digital codes is not limited herein.

In step S340, the control unit 150 compares the transmission frequency FE and the reference frequency. If the transmission frequency FE is higher than the reference frequency, the step S350 is executed. If the transmission frequency FE is lower than or equals to the reference frequency, the step S360 is executed.

In the embodiment, the control unit 150 gets the result of the value comparison between the transmission frequency FE and the reference frequency by comparing the second digital code and the second reference digital code corresponding to the reference frequency. The process is similar with the comparing operation of the first digital code, which is omitted.

In step S350, the control unit 150 determines the drive voltage VD is greater than the reference voltage, and when the transmission frequency FE is higher than the reference frequency, the control unit 150 outputs position normal information.

For example, when the drive voltage VD is greater than the reference voltage, and the transmission frequency FE is higher than the reference frequency, the position of the electronic device 200 has no deviation and it is charged efficiently. The control unit 150 transmits the position normal information to the main circuit 130 via the communication interface 140. The main circuit 130 sends the position normal information to remind users in various ways, such as a light emitting diode (LED), an instant message in an application program or the signal transmission intensity on a screen of the electronic device 200.

In step S360, when the drive voltage VD is less than or equals to the reference voltage, or the transmission frequency is lower than or equals to the reference frequency, the control unit 150 outputs the position deviation information.

For example, when the drive voltage VD is less than or equals to the reference voltage, or the transmission frequency FE is lower than or equals to the reference frequency, the position of the electronic device 200 has a deviation, and the electronic device 200 does not receive the energy signal E from the wireless charger base 100 efficiently. The control unit 150 transmits the position deviation information to the main circuit 130 via the communication interface 140. The main circuit 130 reminds the user that the position of the electronic device 200 needs to be adjusted.

In other words, the electronic device 200 detects the efficiency of the wireless charging in real time and reminds the user whether the position of the electronic device needs to be adjusted, which ensures an efficient charging. Furthermore, the reliability of the wireless charger base 100a and the electronic device 200 in operating is improved.

Figure 4:
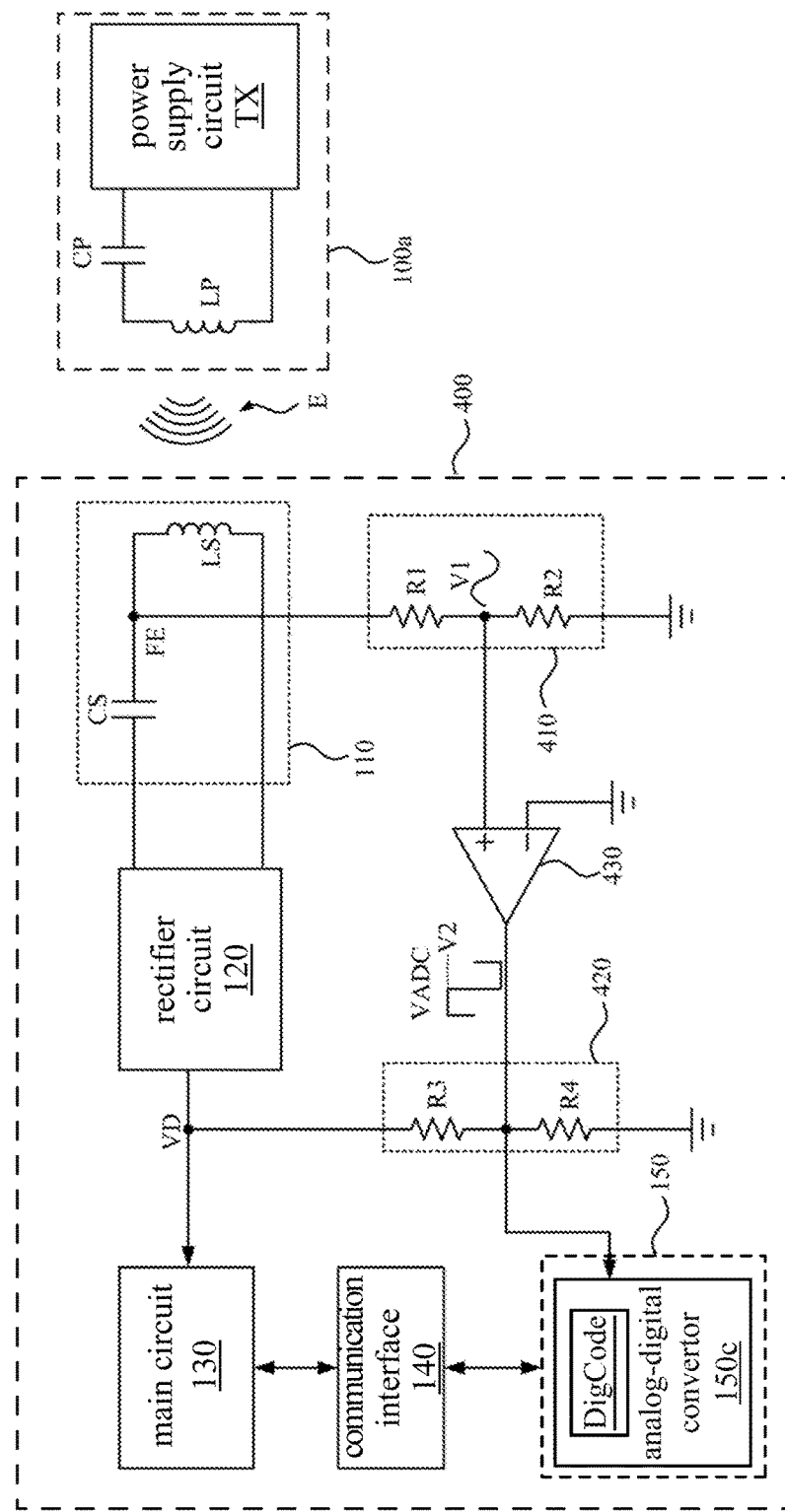
FIG. 4 is a schematic diagram showing an electronic device in an embodiment.

FIG. 4 is a schematic diagram showing an electronic device in an embodiment. As shown in FIG. 4, the components of the electronic device 400 are the same as those of the electronic device 100, and similar illustrations are omitted herein. Compared with the electronic device 100, the electronic device 400 further includes a voltage division circuit 410, a voltage division circuit 420 and a comparator 430.

As shown in FIG. 4, the voltage division circuit 410 includes a resistor R1 and a resistor R2 coupled to each other in series, and the voltage division circuit 420 includes a resistor R3 and a resistor R4 coupled to each other in series. The voltage division circuit 410 is coupled to the coil LS to divide the voltage of the energy signal E to generate the voltage V1. The frequency of the voltage V1 changes with the transmission frequency FE. The voltage division circuit 420 is coupled to the rectifier circuit 120 to divide the voltage of the drive voltage VD and generates the voltage V2. The comparator 430 is coupled between the voltage division circuit 410 and the voltage division circuit 420. The comparator 430 generates a detection signal VADC according to the voltage V1. The voltage level of the detection signal VADC changes with the level of the voltage V2, and the frequency of the detection signal VADC changes with the frequency of the voltage V1.

In other words, the detection signal VADC reflects two features corresponding to the transmission frequency and the drive voltage VD. Compared with the electronic device 200 in FIG. 2, the control unit 150 in the embodiment includes an analog-digital convertor 150c. The analog-digital convertor 150c converts the detection signal VADC to a sample digital code (not shown in FIG. 4). The control unit 150 compares the sample digital code with the first reference digital code and the second reference digital code, respectively, to obtains the relation between the transmission frequency FE and the reference frequency and the relation between the drive voltage VD and the reference voltage.

The electronic device 400 executes the method 300 of detecting the efficiency of charging to determine whether the position of the electronic device 400 needs to be adjusted. The operation is similar with the previous embodiment, and similar description is omitted.

In an embodiment, the control unit 150 and the components applying the method 300 can be software, hardware or firmware, such as a microprocessor or a digital signal processing chip, or they are achieved via software and performed by a processor in the main circuit 130. The control unit 150 or the embodiments applying the method 300 are selected by persons having ordinary skill in the art according to requirements.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An electronic device, comprising:
   an energy collection circuit including a coil, receiving an energy signal transmitted from a wireless charger base, wherein the energy signal includes a transmission frequency;
   a rectifier circuit coupled to the energy collection circuit to generate a drive voltage according to the energy signal;
   a control unit coupled to the energy collection circuit for comparing the drive voltage and a reference voltage and comparing the transmission frequency and a reference frequency, respectively;
   a first voltage division circuit coupled to the coil to divide voltage of the energy signal to generate a first voltage;
   a second voltage division circuit coupled to the rectifier to divide a voltage of the drive voltage to generate a second voltage; and
   a comparator coupled between the first voltage division circuit and the second voltage division circuit and generating a detection signal according to the first voltage,
   wherein a voltage level of the detection signal changes with a level of the second voltage, and a frequency of the detection signal changes with a frequency of the first voltage,
   wherein when the drive voltage is less than or equals to the reference voltage, or when the transmission frequency is lower than or equals to the reference frequency, position deviation information is outputted.

2. The electronic device according to claim 1, wherein the transmission frequency is a frequency of current which flows through the coil.

3. The electronic device according to claim 2, wherein the electronic device further includes:
   a frequency-voltage convertor coupled to the energy collection circuit to detect the transmission frequency and generate a transmission voltage according to the transmission frequency.

4. The electronic device according to claim 3, wherein the control unit stores a first reference digital code and a second reference digital code, the first reference digital code corresponds to the drive voltage, the second reference digital code corresponds to the transmission frequency, and the control unit further includes:
   a first analog-digital convertor generating a first digital code according to the drive voltage; and
   a second analog-digital convertor generating a second digital code according to the transmission voltage,
   wherein the control unit compares the first digital code and the first reference digital code, and compares the second digital code and the second reference digital code.

5. The electronic device according to claim 3, wherein the control unit stores a first reference digital code and a second reference digital code, the first reference digital code corresponds to the drive voltage, the second reference digital code corresponds the transmission frequency, and the control unit includes:
   an analog-digital convertor generating a sample digital code according to the detection signal, wherein the control unit compares the sample digital code and the first reference digital code, and compares the sample digital code and the second reference digital code, respectively.

6. The electronic device according to claim 1, wherein the electronic device further includes:
   a main circuit coupled to the rectifier circuit to receive the drive voltage; and
   a communication interface coupled between the control unit and the main circuit, wherein the main circuit enables the control unit via the communication interface to compare the transmission frequency with the reference frequency and compare the drive voltage with the reference voltage.

7. A method of detecting efficiency of charging applied to an electronic device, wherein a coil of the electronic device receives an energy signal transmitted from a wireless charger base, the energy signal includes a transmission frequency, and a drive voltage is generated according to the energy signal by a rectifier circuit, the method comprising following steps:
   detecting the transmission frequency and the drive voltage;
   comparing the drive voltage and a reference voltage, and comparing the transmission frequency and reference frequency;
   outputting position deviation information when the drive voltage is less than or equals to the reference voltage, or when the transmission frequency is less than or equals to the reference frequency;
   dividing a voltage of the energy signal to generate a first voltage by a first voltage division circuit, wherein the first voltage division circuit is coupled to the coil;
   dividing a voltage of the drive voltage to generate a second voltage by a second voltage division circuit, wherein the second voltage division circuit is coupled to the rectifier circuit; and
   generating a detection signal according to the first voltage by a comparator, wherein the comparator is coupled between the first voltage division circuit and the second voltage division circuit, a voltage level of the detection signal changes with a level of the second voltage, and a frequency of the detection signal changes with a frequency of the first voltage.

8. The method according to claim 7, wherein the step of detecting the transmission frequency and the drive voltage includes:
   converting the transmission frequency to a transmission voltage by a frequency-voltage convertor;
   generating a first digital code according to the drive voltage by a first analog-digital convertor; and
   generating a second digital code according to the transmission voltage by a second analog-digital convertor.

9. The method according to claim 8, wherein the step of comparing the drive voltage and the reference voltage includes:
   comparing the first digital code and a first reference digital code corresponding to the reference voltage by a control unit; and
   comparing the second digital code and a second reference digital code corresponding to the transmission frequency by the control unit.

* * * * *